United States Patent [19]

Lee

[11] 4,244,497
[45] Jan. 13, 1981

[54] BALL RACK FOR A BICYCLE

[76] Inventor: Robert E. Lee, 5125 E. Third, Long Beach, Calif. 90814

[21] Appl. No.: 22,061

[22] Filed: Mar. 19, 1979

[51] Int. Cl.³ .................................................. B62J 7/06
[52] U.S. Cl. ...................................... 224/36; 224/919
[58] Field of Search ................... 224/37, 36, 35, 30 R, 224/30 A, 41, 32 R, 39, 45 L, 247, 919; 248/302, 311.1 R

[56] References Cited

U.S. PATENT DOCUMENTS

| | | | |
|---|---|---|---|
| 637,762 | 11/1899 | Buley et al. | 224/36 |
| 2,589,497 | 3/1952 | Jette | 224/35 |
| 3,907,183 | 9/1975 | Shearer, Sr. et al. | 224/39 |
| 4,069,956 | 1/1978 | Shearer, Sr. et al. | 224/37 |

FOREIGN PATENT DOCUMENTS

| | | | |
|---|---|---|---|
| 22633 | 12/1917 | Denmark | 224/37 |
| 458415 | 3/1920 | Fed. Rep. of Germany | 224/36 |

*Primary Examiner*—Robert J. Spar
*Assistant Examiner*—Kenneth Noland
*Attorney, Agent, or Firm*—Fulwider, Patton, Rieber, Lee & Utecht

[57] ABSTRACT

A rack for a bicycle is configured out of a single length of resilient wire curved to form a pair of arcuate bails. A wire carrying handle is formed at the center of the wire between the bails, while fasteners are defined at the opposite ends of the bails. The bails are spaced to pass on either side of the center of a spherical ball, such as a basketball, volleyball or soccer ball, and the fasteners are releasably attachable to the handle bars or seat supporting framework of a bicycle.

9 Claims, 7 Drawing Figures

U.S. Patent    Jan. 13, 1981    4,244,497
FIG. 1
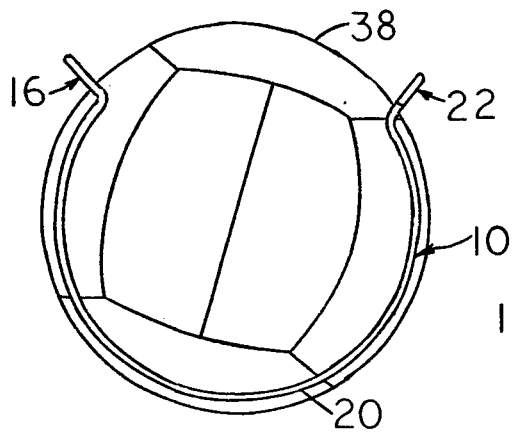
FIG. 2
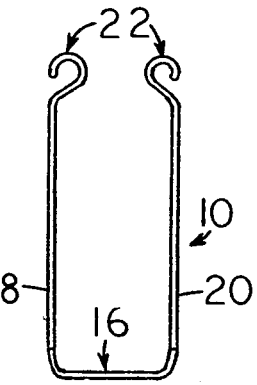
FIG. 3
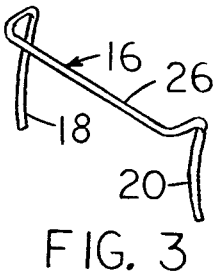
FIG. 4
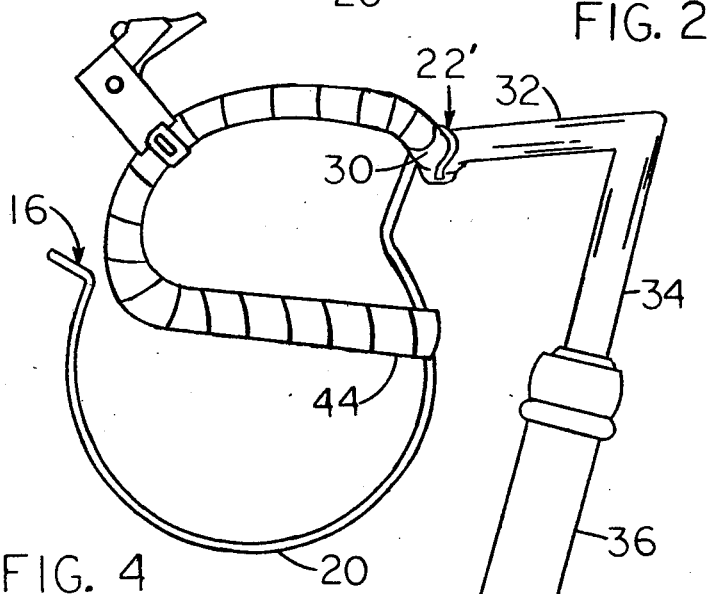
FIG. 7
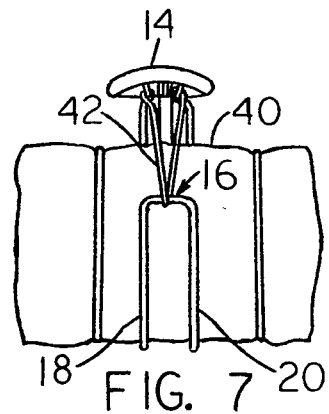
FIG. 5
FIG. 6
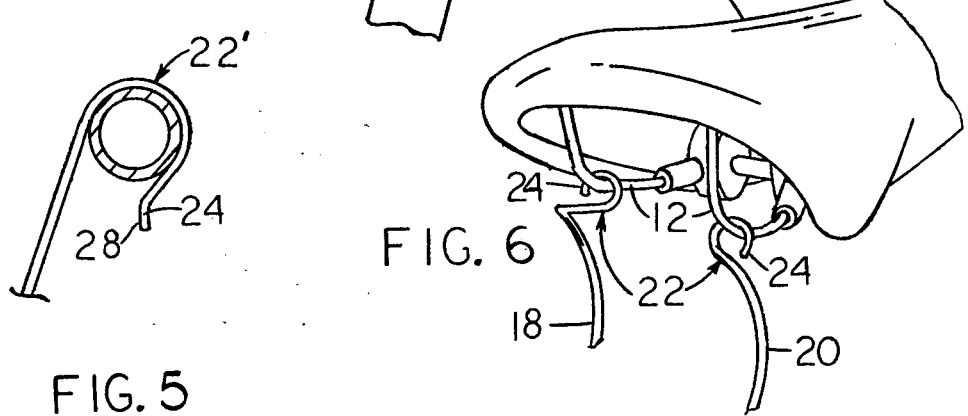

BALL RACK FOR A BICYCLE

BACKGROUND OF THE INVENTION

1. Field of the Invention

The present invention relates to carrying racks for mounting upon a bicycle.

2. Description of the Prior Art

In the past, various types of bicycle carrying racks have been devised to aid bicycle riders in carrying various articles and objects. Wire mesh baskets mounted on the front of a bicycle have for many years been used to carry articles on a bicycle and to allow the bicycle rider to properly grasp both hand grips at the handle bar extremities in order to properly steer the bicycle. Wire mesh baskets are typically of generally rectangular prismatic configuration and include clamps which are secured to the handle bars on either side of the front wheel fork center post. Some of the conventional types of wire baskets include elongated struts that extend downward from the bottom of the basket and are secured by fastening nuts to the extremities of the front axle of the bicycle. Other wire baskets are designed for much lighter duty and do not require support from the front axle of the bicycle.

Other types of conventional bicycle racks are designed for mounting above the rear wheel of a bicycle. Such racks typically include a horizontal wire platform upon which books and other articles can be positioned. Typically, either a spring loaded or elastic retainer is utilized to hold the articles in position upon the horizontal platform. The platform itself is supported from beneath by struts extending to the rear bicycle axle and sometimes by connectors to the rear wheel yoke or to the tube that receives the bicycle seat stem.

Conventional bicycle racks have failed to provide an adequate means for carrying large balls, such as basketballs, soccer balls and volleyballs. When these types of balls are carried in a bicycle basket, they frequently tend to bounce out as the bicycle moves, even when traveling over relatively smooth pavement. These larger sporting balls are typically inflated, and hence are quite resilient. Even very minor jolts that are encountered will tend to throw these balls from a basket unless they are secured. Conventional bicycle racks fail to provide a convenient means for securing large inflated balls in them, and hence are unsuitable for the transport of such balls.

Because of the inadequacy of conventional bicycle racks for carrying inflated balls, many bicyclists have abandoned the conventional racks available, and ride their bicycles using only one hand to steer with a ball tucked underneath the opposite arm. It is apparent that this presents a considerable safety hazard, since a bicyclist cannot exercise nearly the degree of control when steering with one hand as with both hands. Nevertheless, the practice of riding in this fashion is a common one, especially with older adolescents who feel that they are able to exercise the necessary degree of steering control while riding a bicycle carrying a large inflated ball under one arm. Furthermore, such individuals are typically more involved in sports that require the use of an inflated ball and which require bicycle travel to a basketball or volleyball court, or to a soccer field.

SUMMARY OF THE INVENTION

The present invention is a carrying rack for removable attachment to a bicycle and which is uniquely suited for the transport of a large inflated ball. The carrying rack of the invention is constructed of a single length of resilient wire, bent at its center to form a hand grip, and configured to define symmetrical, parallel, arcuate retaining bails in parallel planes on either side of the hand grip. The bails extend in obtuse circular arcs and terminate in readily releasable fasteners at their extremities. The fasteners are designed for attachment to the handle bars of a bicycle on either side of the center post of the front wheel fork, also for attachment to the supporting framework of the bicycle seat.

When constructed according to the preferred embodiment, a bicycle rack according to the invention will receive and retain several different diameters of inflated balls. A single carrying rack can thereby accommodate, basketballs, volleyballs and soccer balls, even though these balls vary in diameter. Furthermore, the utilization of the invention is not limited to use with balls, or to use with bicycles. For example, a sleeping bag can be rolled and inserted into the carrying rack of the invention crosswise across the front of the bicycle. Typically, an elastic retainer could be utilized to hold other articles while the sleeping bag is in position within the cradle formed by the rack of the invention. In addition, the carrying rack of the invention can be used to carry basketballs, volleyballs, soccer balls and other inflated balls other than on a bicycle. The central hand grip allows the ball to be carried easily in one hand so that a person need not wrap an arm around the ball in order to hold it as is otherwise necessary. Moreover, the carrying rack of the invention can be secured to objects other than a bicycle. For example, the releasable fasteners can be secured to the framework of a backpack, so that an inflated ball can be carried along with other articles in the pack.

The versatility, light weight and ease of manipulation of the carrying rack of the invention render it an extremely useful and valuable device. Moreover, because the ball carrying rack of the invention holds an inflated ball securely in position on a bicycle, neither of the cyclists hands is occupied and both of the cyclists hands are available for steering the bicycle in a safe, proper fashion. The cyclist need not remove his hands from the handbar grips in order to steady the ball in the carrying rack of the invention, or to hold it or manipulate it in any manner will traveling on the bicycle. The invention thereby provides a significant safety aid to bicyclists who carry inflated balls and other large articles on their vehicles.

The invention may be described with greater clarity and particularity by reference to the accompanying drawings.

DESCRIPTION OF THE DRAWINGS

FIG. 1 is a side elevational view of one embodiment of the carrying rack of the invention showing a basketball secured therein.

FIG. 2 is a top plan view of the embodiment of FIG. 1 with the basketball removed.

FIG. 3 is a perspective view of the handgrip of the carrying rack of the invention.

FIG. 4 is a side elevational view of an alternative embodiment of the invention mounted on the handbars of a bicycle.

FIG. 5 is a detail view of one of one of the fasteners of the embodiment of FIG. 4.

FIG. 6 is a detail view showing the attachment of the embodiment of FIG. 1 to the supporting framework of a bicycle seat.

FIG. 7 illustrates the manner of securing a sleeping bag in the embodiment of FIG. 1.

DESCRIPTION OF THE EMBODIMENTS

FIG. 1 illustrates a wire carrying rack 10 adapted for attachment to longitudinally extending brace wires 12 that support a bicycle seat 14 above a bicycle framework, in the fashion depicted in FIG. 6. The wire rack 10 is formed of a single length of resilient wire bent to form a central U-shaped handgrip 16, depicted in isolation in FIG. 3. From either side of the handgrip 16, retaining bails 18 and 20 extend in symmetrical parallel obtuse arcs, as depicted in FIGS. 1 and 4. The bails 18 and 20 lie in parallel planes, as is apparent from FIG. 2, and terminate in releasable fastening hooks 22, depicted in FIGS. 2 and 6. The bails 18 and 20 both define an article receptive area therein between the hand grip 16 and the hooks 22, as illustrated in FIG. 1. The hooks 22 are formed as circular arcuate loops, preferably about one half an inch in diameter, and are located at the extremities of the ends of the wire member forming the rack 10. The hooks 22 are spaced inwardly from the bails 18 and 20 to a distance corresponding the distance between the longitudinal framework members 12 at the underside of the bicycle seat 14, illustrated in FIG. 6. The hooks 22 do not form complete circular wire loops, but rather, the tips 24 of the wire stop short of a full circle so that gaps are defined in the perimeter of the loops of the hooks 22 to receive the longitudinal framework wires 12.

The carrying rack 10 is constructed of aluminum alloy wire about 3/16 inches in diameter. The hand grip 16, depicted in FIG. 3 is formed of a U-shaped segment directed outwardly from the convex curvature of the bails 18 and 20. The middle portion 26 of the hand grip 16 is of a length of at least about 3½ inches, and preferably is at least about 4 inches in length, in order to accommodate the width of the palm of the hand of an individual grasping it. A width of 4 inches is quite satisfactory for the spaced distance between the bails 18 and 20, since this distance allows the wire rack 10 to snugly accommodate basketballs, volleyballs and soccer balls of commercially available construction and diameter. The bails 18 and 20 are preferably configured in circular arcs having a diameter of about 7 and ¾ inches.

An alternative embodiment of the wire ball carrying rack of the invention is depicted at 10' in FIG. 4. The construction of the embodiment of FIG. 4 is identical to that of FIG. 1 with the exception that the hooks 22' are each coplanar with their associated bails 18 and 20. The hooks 22' are configured in obtuse arcs, as depicted in detail in FIG. 5, with the tips turned outwardly away from the center of curvature of the wire to form tangs 24'. The tangs 24' formed by the wire tips of the hooks 22' extend outward from the center of curvature of the hooks 22' to form a camming surface 28. The camming surface 28 coacts to snugly, but releasably secure the hooks 22' to the tranverse portions of the handle bars 30. That is, the carrying rack 10' is positioned slightly above the disposition indicated in FIG. 4 with the camming surfaces 28 of the tangs 24' in contact with the transverse portions of the handle bars 30. The hooks 22' are then forced onto the handle bars 30, with the resilient wire construction allowing the camming surfaces 28 to deflect to receive the handle bars 30, and to thereafter return to allow the hooks 22' to reside in close fitting engagement therewith in the fashion depicted in FIG. 5.

Similarly, the hooks 22 of the embodiment of FIGS. 1 and 6 can be attached to the longitudinally extending seat supporting brace wires 12, depicted in FIG. 6. To this end, the bails 18 and 20 are compressed slightly toward each other and the hooks 22 are positioned facing outwardly toward the longitudinally extending supporting wires 12. When the bails 18 and 20 are released, the wire of the hooks 22 is resiliently yieldable to allow them to pass over the wires 12 which are received in the gaps defined at the tips 24 of the hooks 22. When the wire rack 10 is releasably attached to the underside of the bicycle seat 14, it will depend therefrom in the position depicted in FIG. 6. The seat 14 must be high enough to allow the rack 10 to clear the rear bicycle wheel, or the wheel must be equipped with a fender or other shield. Likewise, when the wire carrying rack 10' is attached to the bicycle handle bars 30, it is carried in the manner depicted in FIG. 4. The center rod 32 that carries the bicycle handle bars 30 extends rearward from the handlebars 30 to the central support stem 34 that is telescopically received in the bearing tubing 36. The lower portion of the bearing tubing (not shown) is welded to the bicycle frame.

The wire carrying rack of the invention may be utilized to carry a basketball 38, as depicted in FIG. 1. Alternatively, the same carrying rack 10 can be used to carry a volleyball or soccer ball. Moreover, the carrying rack 10 can be used in the manner depicted in FIG. 7 to carry a sleeping bag 40. In such an arrangement, an elastic strap 42 can be hooked to the longitudinally extending supporting wires 12 at the underside of the seat 14 so that other articles can be affixed and retained within the carrying rack 10. The embodiment 10' of the carrying rack of the invention, depicted in FIG. 4, is equally as versatile.

It can be seen that when the rack 10 or 10' is removed from a bicycle, the handgrip 16 serves as a convenient handle by which the ball 38 can be carried by hand. A person merely slips his fingers into the gap between the handle 16 and the ball 38 and carries the ball 38 in the rack 10 or 10'. The ball 38 can, of course, be extracted for use by pushing it outward from between the bails 18 and 20 to force the bails slightly apart to free the ball 38. Reinsertion of the ball 38 is accomplished with equal facility. In inserting a ball 38 into the rack 10, the resilient wire structure of the rack 10 allows the bails 18 and 20 to yield to the extent required to allow the ball 38 to be inserted thereinbetween in the manner depicted in FIG. 1. It should be noted, in this regard, that basketballs, volleyballs and soccer balls are all inflated balls, and hence are themselves resilient. As a consequence, the cooperative resiliency between the wire racks 10 and 10' and a ball to be carried therein provides a snug, close fitting relationship between the ball and carrying rack, yet an arrangement from which the ball 38 can easily be extracted for use.

When carried on a bicycle, the racks 10 and 10' depend downward from their points of attachment. The racks 10 and 10' are available for use with practically any type of basketball, soccer ball or volleyball. When balls of this type are carried using the rack of the invention, the bicycle rider is able to grasp both of the handlebar grips 42 so as to maintain a high degree of control in steering a bicycle while carrying a ball of cumbersome size. When the ball is to be used, the entire rack 10 or 10' will typically be removed from the bicycle and carried by the hand grip 16 in order to transport the ball on foot to the specific location where it is to be used. Thereafter, the ball can be easily removed either by spreading the bails by pulling the fastening hooks 22 or 22' away from the handgrip 16, or by pressing on the ball 38 to force it out of the constraints of the bails 18 and 20.

It must be understood that numerous variations and modifications to the invention will occur readily to those familiar with bicycle carrying devices. Accordingly, the scope of the invention should not be construed as limited to the specific embodiments depicted, but rather as defined in the claims appended hereto. For example, it should be understood that a carrying rack having bails configured in smaller circular arcs can be used to carry footballs and other smaller spherical articles. Likewise, an increase in diameter of the circular arcs formed by the bails 18 and 20 will allow even larger articles to be transported.

I claim:

1. A carrying rack for removable attachment to a bicycle comprised of a single length of resilient wire bent to form a U-shaped hand grip having a linear central portion with leg portions at both ends thereof disposed substantially perpendicular to said linear central portion, and from said leg portions said wire is bent into mutually congruent, circular, obtuse arcuate bails defining an article receptive area therein, and said hand grip is displaced outwardly from the radius of curvature of said bails and outwardly from said receptive area and said bails are laterally spaced from each other and constructed with an undeformed diameter large enough to capture a small enough to snugly restrain movement of basketballs, volleyballs and soccer balls therein, and the ends of said arcuate bails remote from said hand grip are turned outwardly away from the radius of curvature of said bails beyond said receptive area to form open sided hooks manipulatable for releasable securement to the framework of a bicycle, and said hand grip allows ready removal and insertion of an article in said receptive area.

2. A carrying rack according to claim 1 further characterized in that said bails are spaced apart a distance of about four inches.

3. A carrying rack according to claim 1 further characterized in that each of said fasteners is configured as a hook fashioned in coplanar relationship with one of said bails.

4. A carrying rack according to claim 3 further characterized in that said hooks are shaped in obtuse arcs with tangs that extend outward from the center of curvature, thereby forming camming surfaces to resiliently spread said hooks for engagement on the handlebars of a bicycle.

5. A carrying rack according to claim 1 further characterized in that said fasteners are hooks formed in a plane perpendicular to the planes in which said bails lie.

6. A carrying rack according to claim 5 further characterized in that said hooks are formed by loops spaced apart a distance corresponding to the distance between longitudinal framework members at the underside of a bicycle seat, and said loops define outwardly directed gaps in their perimeters to receive said longitudinal framework members for attachment thereto.

7. A carrying rack according to claim 6 further characterized in that said loops are formed as obtuse circular arcs having a radius of about one half an inch.

8. A carrying rack according to claim 1 further characterized in that said leg portions of said grip are disposed perpendicular to said bails, and said linear central portion of said hand grip is formed with a length of at least about three and one half inches.

9. A carrying rack according to claim 1 further characterized in that said wire is aluminum alloy wire about three sixteenth inches in diameter.

* * * * *

UNITED STATES PATENT AND TRADEMARK OFFICE
CERTIFICATE OF CORRECTION

PATENT NO. : 4,244,497

DATED : Jan. 13, 1981

INVENTOR(S) : Robert E. Lee

It is certified that error appears in the above—identified patent and that said Letters Patent is hereby corrected as shown below:

Column 5, Claim 1, line 34, "a" should read -- and --.

Signed and Sealed this

Twenty-sixth Day of May 1981

[SEAL]

Attest:

RENE D. TEGTMEYER

Attesting Officer     Acting Commissioner of Patents and Trademarks